United States Patent
Azuma et al.

(10) Patent No.: US 10,372,089 B2
(45) Date of Patent: Aug. 6, 2019

(54) PREDICTED VALUE SHAPING SYSTEM, CONTROL SYSTEM, PREDICTED VALUE SHAPING METHOD, CONTROL METHOD, AND PREDICTED VALUE SHAPING PROGRAM

(71) Applicant: JAPAN SCIENCE AND TECHNOLOGY AGENCY, Saitama (JP)

(72) Inventors: Shun-ichi Azuma, Kyoto (JP); Yuki Minami, Osaka (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 0 days.

(21) Appl. No.: 15/503,245

(22) PCT Filed: Sep. 14, 2015

(86) PCT No.: PCT/JP2015/004670
§ 371 (c)(1),
(2) Date: Feb. 10, 2017

(87) PCT Pub. No.: WO2016/056176
PCT Pub. Date: Apr. 14, 2016

(65) Prior Publication Data
US 2017/0235285 A1  Aug. 17, 2017

(30) Foreign Application Priority Data
Oct. 10, 2014 (JP) .................................. 2014-209483

(51) Int. Cl.
*G05B 11/36* (2006.01)
*G05B 13/04* (2006.01)

(52) U.S. Cl.
CPC ............ *G05B 13/048* (2013.01); *G05B 11/36* (2013.01); *G05B 13/04* (2013.01)

(58) Field of Classification Search
CPC .................................................. G05B 13/042
(Continued)

(56) References Cited

U.S. PATENT DOCUMENTS

| 4,539,633 A * | 9/1985 | Shigemasa ........... G05B 13/042 318/561 |
| 6,760,716 B1 * | 7/2004 | Ganesamoorthi .... G05B 13/027 706/14 |

(Continued)

FOREIGN PATENT DOCUMENTS

| JP | H06-102939 A | 4/1994 |
| JP | H11-119805 A | 4/1999 |

(Continued)

OTHER PUBLICATIONS

English Translation of International Search Report issued in Application No. PCT/JP2015/004670 dated Nov. 17, 2015.

(Continued)

*Primary Examiner* — Emilio J Saavedra
(74) *Attorney, Agent, or Firm* — Pearne & Gordon LLP

(57) ABSTRACT

A predicted value shaping system is provided for calculating a highly accurate control value by shaping of a predicted value. A prediction governor for calculating a control value (v) for controlling a controlled object includes: a result value acquisition unit that acquires a previous target value of the controlled object, that is, a result value ($r(t-1)$); a predicted value acquisition unit that acquires a predicted value ($\hat{r}(t)$) obtained by predicting the target value of the controlled object; and a control value calculation unit that calculates a control value ($v(t)$) for controlling the controlled object by applying the result value ($r(t-1)$) and the predicted value (Continued)

(r^(t)) to a predicted value shaping algorithm (G) to correct the predicted value (r^(t). The predicted value shaping algorithm (G) uses parameters of a control model (P) of the controlled object.

14 Claims, 14 Drawing Sheets

(58) Field of Classification Search
USPC .......................................................... 700/108
See application file for complete search history.

(56) References Cited

U.S. PATENT DOCUMENTS

| 7,343,217 B2 * | 3/2008 | Tanaka | G05B 13/048 |
| | | | 700/108 |
| 2011/0106402 A1 * | 5/2011 | Yasui | G05B 13/048 |
| | | | 701/102 |

FOREIGN PATENT DOCUMENTS

| JP | 2000-066731 A | 3/2000 |
| JP | 2004-295226 A | 10/2004 |
| JP | 2006-288151 A | 10/2006 |

OTHER PUBLICATIONS

FENG Aixiang et al., "Model Predictive Control with Input Feedback and Its Controllability for Unsymmetrical Systems," CIESC Journal, vol. 63, No. S2, Dec. 2012, pp. 106-111.

* cited by examiner

--PRIOR ART--

--PRIOR ART--

--PRIOR ART--

US 10,372,089 B2

PREDICTED VALUE SHAPING SYSTEM, CONTROL SYSTEM, PREDICTED VALUE SHAPING METHOD, CONTROL METHOD, AND PREDICTED VALUE SHAPING PROGRAM

CROSS REFERENCES TO RELATED APPLICATIONS

This application is the U.S. National Phase of International Application Serial No. PCT/JP2015/004670 filed on Sep. 14, 2015, which claims the benefit of priority to Japanese Patent Application No. 2014-209483 filed on Oct. 10, 2014, the entire disclosures of which are incorporated herein by reference.

TECHNICAL FIELD

The present invention relates to a predicted value shaping system for calculating a control value for controlling a controlled object and a control system including the predicted value shaping system, a predicted value shaping method and a control method including the predicted value shaping method, and a predicted value shaping program.

BACKGROUND ART

There is a feedforward control system for performing feedforward control using a controller to an object to be controlled (controlled object). In an ideal feedforward control system, a target value is given to a system, as a control value for controlling a controlled object, and a physical quantity matching the target value is output from the controlled object.

FIG. 12 is a block diagram illustrating a configuration of the ideal feedforward control system. A target value r is given to a controller of a system 101 including the controller and a controlled object, and the controller drives the controlled object with a drive signal in accordance with the target value r, whereby an output $y_r$ corresponding to the target value r is obtained from the system 101.

For example, the above feedforward control system is configured in a power generation system, in which a power generation system including a power generator and its controller is the system 101. When an amount of power demand is input as the target value r to a controller for controlling an amount of power generation of the power generator, power $y_r$ of about the same amount as the power demand is output from the power generator.

In an actual situation, a target value to be given to a system (that is, an amount of output of a controlled object currently required) is unknown, and a predicted value obtained by predicting the target value with a predetermined prediction model has to be given to the system in many cases.

For example, since a current amount of power demand (an amount of power actually required) cannot be accurately obtained in a case of the power generation system described above, a predicted value obtained with a predetermined prediction model has to be given to the power generation system.

FIG. 13 is a block diagram illustrating a configuration of a control system controlled with a predicted value. A predicted value $$\hat{r}$$ [Expression 1]

obtained with a predetermined prediction model is given to a system 102. Incidentally, in the following, $$\hat{r}$$ [Expression 2]

is also written as "r^." An output $y_{\hat{r}}$ depending on the predicted value r^ is obtained from the system 102.

However, in a case of controlling with the predicted value, an error occurs also in the output of the controlled object by an amount corresponding to a prediction error (that is, a difference between the predicted value and the actual target value). Therefore, a feedforward control system has been known provided with a prediction governor (predicted value shaper) for correcting (shaping) the predicted value given to the system by using a previous target value (that is, a control value actually required previously) as a result value, in order to prevent influence of the prediction error from influencing the output of the system. Here, the result value is not a previous output value, but is a control value actually required, and the result value is independent of the output value.

FIG. 14 is a block diagram illustrating a configuration of a control system provided with a prediction governor. A previous target value (result value) r is given to a prediction governor 201, in addition to a predicted value r^. The prediction governor 201 calculates a control value v on the basis of these predicted value r^ and result value r, and outputs the control value v to a system 103. An output $y_v$ corresponding to the control value v is obtained in the system 103.

For example, in a case of the power generation system described above, the predicted value r^ of the amount of power demand obtained by applying the weather, the temperature, and the like to the prediction model, is corrected by using the result value r of, for example, a few minutes ago (that is, the control value actually required a few minutes ago) in the prediction governor 201, and can be given to the system 103. With such a feedforward control system, balancing control is performed.

CITATION LIST

Patent Literature

Patent Literature 1: JP 2006-288151 A

SUMMARY OF INVENTION

Technical Problem

An object of the present invention is to provide a predicted value shaping system for calculating a highly accurate control value by shaping of a predicted value, a control value calculation method, and a control value calculation program.

Solution to Problem

A predicted value shaping system of one aspect of the present invention is a predicted value shaping system for correcting a predicted value obtained by predicting a target value for controlling a controlled object, and the predicted value shaping system has a configuration including: a predicted value acquisition unit that acquires the predicted value; a result value acquisition unit that acquires a result value that is a previous target value of the controlled object; and a control value calculation unit that calculates a control value for controlling the controlled object by applying the result value and the predicted value to an algorithm to correct the predicted value, wherein the algorithm uses parameters of a control model of the controlled object.

With this configuration, the predicted value is corrected with the algorithm using the parameters of the control model of the controlled object, so that correction suitable for the controlled object can be performed, and it is possible to obtain a control value which allows the output of the system to approach an output of the system of when the system is controlled with the target value.

In the above predicted value shaping system, the algorithm may be an algorithm for correcting the predicted value so as to reduce influence on an output of the controlled object given by a previous prediction error that is a difference between the previous predicted value and the result value.

With this configuration, the algorithm is provided for correcting the predicted value so as to reduce the influence on the output of the controlled object given by the difference (previous prediction error) between the previous predicted value and the result value.

A predicted value shaping system of another aspect of the present invention is a predicted value shaping system for correcting a predicted value obtained by predicting a target value for controlling a controlled object, and the predicted value shaping system has a configuration including: a predicted value acquisition unit that acquires the predicted value; a result value acquisition unit that acquires a result value that is a previous target value of the controlled object; and a control value calculation unit that calculates a control value for controlling the controlled object by applying the result value and the predicted value to an algorithm to correct the predicted value, wherein the algorithm is an algorithm for correcting the predicted value so as to reduce influence on an output of the controlled object given by a previous prediction error that is a difference between the previous predicted value and the result value.

With this configuration, the predicted value is corrected so as to reduce the influence on the output of the controlled object given by the difference (previous prediction error) between the previous predicted value and the result value, so that correction suitable for the controlled object can be performed, and it is possible to obtain a control value which allows the output of the system to approach an output of the system of when the system is controlled with the target value.

In the above predicted value shaping system, the influence may be an output difference between an actual output and an output of when a target value of when there is not the prediction error is applied.

With this configuration, the predicted value is corrected so as to reduce the output difference between the actual output and the ideal output (that is, the output of when the target value of when there is not the prediction error is applied).

The above predicted value shaping system may further include an evaluation unit that evaluates magnitude of the influence by using an evaluation function expressing the output difference.

With this configuration, the evaluation unit evaluates the magnitude of the influence on the output of the controlled object given by the previous prediction error, so that, when the influence is increased, the increase is detected and a countermeasure can be taken such as recalculation of the algorithm.

The above predicted value shaping system may further include an algorithm determination unit that determines the algorithm.

With this configuration, the algorithm for correcting the predicted value can be dynamically determined.

The above predicted value shaping system may further include an evaluation unit that evaluates magnitude of the influence, and the algorithm determination unit may determine the algorithm when the magnitude of the influence evaluated by the evaluation unit is greater than a predetermined magnitude.

With this configuration, when the influence is increased on the output of the controlled object given by the previous prediction error that is a difference between the previous predicted value and the result value, the algorithm can be redetermined.

In the above predicted value shaping system, the algorithm may be an algorithm for minimizing the influence.

With this configuration, the algorithm can be obtained for minimizing the output difference that is the influence on the output of the controlled object given by the previous prediction error, as the algorithm for correcting the predicted value.

In the above predicted value shaping system, the algorithm may be an algorithm for reducing the influence below a predetermined value.

With this configuration, the algorithm can be obtained for correcting the predicted value when the output difference that is the influence on the output of the controlled object given by the previous prediction error is smaller than a predetermined value.

In the above predicted value shaping system, the algorithm may be an algorithm of when it is determined that the influence has converged.

With this configuration, the algorithm can be obtained for correcting the predicted value when the output difference has converged that is the influence on the output of the controlled object given by the previous prediction error.

In the above predicted value shaping system, when the parameters of the control model are $A_P$, $B_P$, $C_P$, the control model may be represented by Equation (1).

[Expression 3]

$$\begin{cases} x_P(t+1) = A_P x_P(t) + B_P v(t) \\ y(t) = C_P x_P(t) \end{cases} \quad (1)$$

where v(t) is the control value at time t, and y(t) is an output of the controlled object at the time t. In addition, the algorithm may be represented by Equation (2).

[Expression 4]

$$\begin{cases} \xi(t+1) = \mathcal{A}^* \xi(t) + \mathcal{B}^*(\hat{r}(t-1) - r(t-1)) \\ v(t) = \mathcal{C}^* \xi(t) + \mathcal{D}^*(\hat{r}(t-1) - r(t-1)) + \hat{r}(t) \end{cases} \quad (2)$$

where $\hat{r}(t)$ is the predicted value at the time t, $\hat{r}(t-1)$ is the previous predicted value before the time t, $r(t-1)$ is the result value, and $\mathcal{A}^* = A_P - B_P(C_P B_P)^{-1} C_P A_P$ $\mathcal{B}^* = -B_P(C_P B_P)^{-1} C_P A_P B_P + A_P B_P$ $\mathcal{C}^* = -(C_P B_P)^{-1} C_P A_P$ $\mathcal{D}^* = -(C_P B_P)^{-1} C_P A_P B_P$ [Expression 5]

With this configuration, the algorithm for correcting the predicted value is optimized.

A control system of one aspect of the present invention has a configuration including: any one of the above predicted value shaping systems; the controlled object; and a controller that controls the controlled object in accordance with the control value calculated by the predicted value shaping system.

Also with this configuration, the predicted value is corrected with the algorithm using the parameters of the control model of the controlled object, so that correction suitable for the controlled object can be performed, or the predicted value is corrected so as to reduce the influence on the output of the controlled object given by the difference (previous prediction error) between the previous predicted value and the result value, so that correction suitable for the controlled object can be performed, and it is possible to obtain a control value which allows the output of the system to approach an output of the system of when the system is controlled with the target value.

A control value calculation method of one aspect of the present invention is a predicted value shaping method for correcting a predicted value obtained by predicting a target value for controlling a controlled object, and the predicted value shaping method has a configuration including: a predicted value acquisition step of acquiring the predicted value; a result value acquisition step of acquiring a result value that is a previous target value of the controlled object; and a control value calculation step of calculating a control value for controlling the controlled object by applying the result value and the predicted value to an algorithm to correct the predicted value, wherein the algorithm uses parameters of a control model of the controlled object.

Also with this configuration, the predicted value is corrected with the algorithm using the parameters of the control model of the controlled object, so that correction suitable for the controlled object can be performed, and it is possible to obtain a control value which allows the output of the system to approach an output of the system of when the system is controlled with the target value.

A control value calculation method of another aspect of the present invention is a predicted value shaping method for correcting a predicted value obtained by predicting a target value for controlling a controlled object, and the predicted value shaping method has a configuration including: a predicted value acquisition step of acquiring the predicted value; a result value acquisition step of acquiring a result value that is a previous target value of the controlled object; and a control value calculation step of calculating a control value for controlling the controlled object by applying the result value and the predicted value to an algorithm to correct the predicted value, wherein the algorithm is an algorithm for correcting the predicted value so as to reduce influence on an output of the controlled object given by a previous prediction error that is a difference between the previous predicted value and the result value.

Also with this configuration, the predicted value is corrected so as to reduce the influence on the output of the controlled object given by the difference (previous prediction error) between the previous predicted value and the result value, so that correction suitable for the controlled object can be performed, and it is possible to obtain a control value which allows the output of the system to approach an output of the system of when the system is controlled with the target value.

A control method of one aspect of the present invention has a configuration including: a control value calculation step of calculating a control value with a predicted value shaping method of any one of the above aspects; and a control step of controlling the controlled object with the control value calculated in the control value calculation step.

Also with this configuration, the predicted value is corrected with the algorithm using the parameters of the control model of the controlled object, so that correction suitable for the controlled object can be performed, or the predicted value is corrected so as to reduce the influence on the output of the controlled object given by the difference (previous prediction error) between the previous predicted value and the result value, so that correction suitable for the controlled object can be performed, and it is possible to obtain a control value which allows the output of the system to approach an output of the system of when the system is controlled with the target value.

A control value calculation program of one aspect of the present invention has a configuration for causing a computer of a predicted value shaping device for correcting a predicted value obtained by predicting a target value for controlling a controlled object, to execute a predicted value acquisition step of acquiring the predicted value, a result value acquisition step of acquiring a result value that is a previous target value of the controlled object, and a control value calculation step of calculating a control value for controlling the controlled object by applying the result value and the predicted value to an algorithm to correct the predicted value, wherein the algorithm uses parameters of a control model of the controlled object.

Also with this configuration, the predicted value is corrected with the algorithm using the parameters of the control model of the controlled object, so that correction suitable for the controlled object can be performed, and it is possible to obtain a control value which allows the output of the system to approach an output of the system of when the system is controlled with the target value.

A predicted value shaping program of another aspect of the present invention has a configuration for causing a computer of a predicted value shaping device for correcting a predicted value obtained by predicting a target value for controlling a controlled object, to execute a predicted value acquisition step of acquiring the predicted value, a result value acquisition step of acquiring a result value that is a previous target value of the controlled object, and a control value calculation step of calculating a control value for controlling the controlled object by applying the result value and the predicted value to an algorithm to correct the predicted value, wherein the algorithm is an algorithm for correcting the predicted value so as to reduce influence on an output of the controlled object given by a previous prediction error that is a difference between the previous predicted value and the result value.

Also with this configuration, the predicted value is corrected so as to reduce the influence on the output of the controlled object given by the difference (previous prediction error) between the previous predicted value and the result value, so that correction suitable for the controlled object can be performed, and it is possible to obtain a control value which allows the output of the system to approach an output of the system of when the system is controlled with the target value.

Advantageous Effects of Invention

According to the present invention, the predicted value is corrected (shaped) with the algorithm using the parameters of the control model of the controlled object, so that correction suitable for the controlled object can be performed, and it is possible to obtain a control value which allows the output of the system to approach an output of the system of when the system is controlled with the target value.

As described below, there are other aspects of the present invention. Accordingly, the present disclosure is intended to provide a part of the present invention, and is not intended to limit the scope of the invention described and claimed herein.

DESCRIPTION OF EMBODIMENTS

Hereinafter, a predicted value shaping system of an embodiment of the present invention will be described with reference to the drawings. Incidentally, the embodiment described below is merely an example of implementing the present invention, and the present invention is not limited to the specific configuration described below. For implementing the present invention, a specific configuration depending on the embodiment may be adopted as appropriate.

Figure 1:
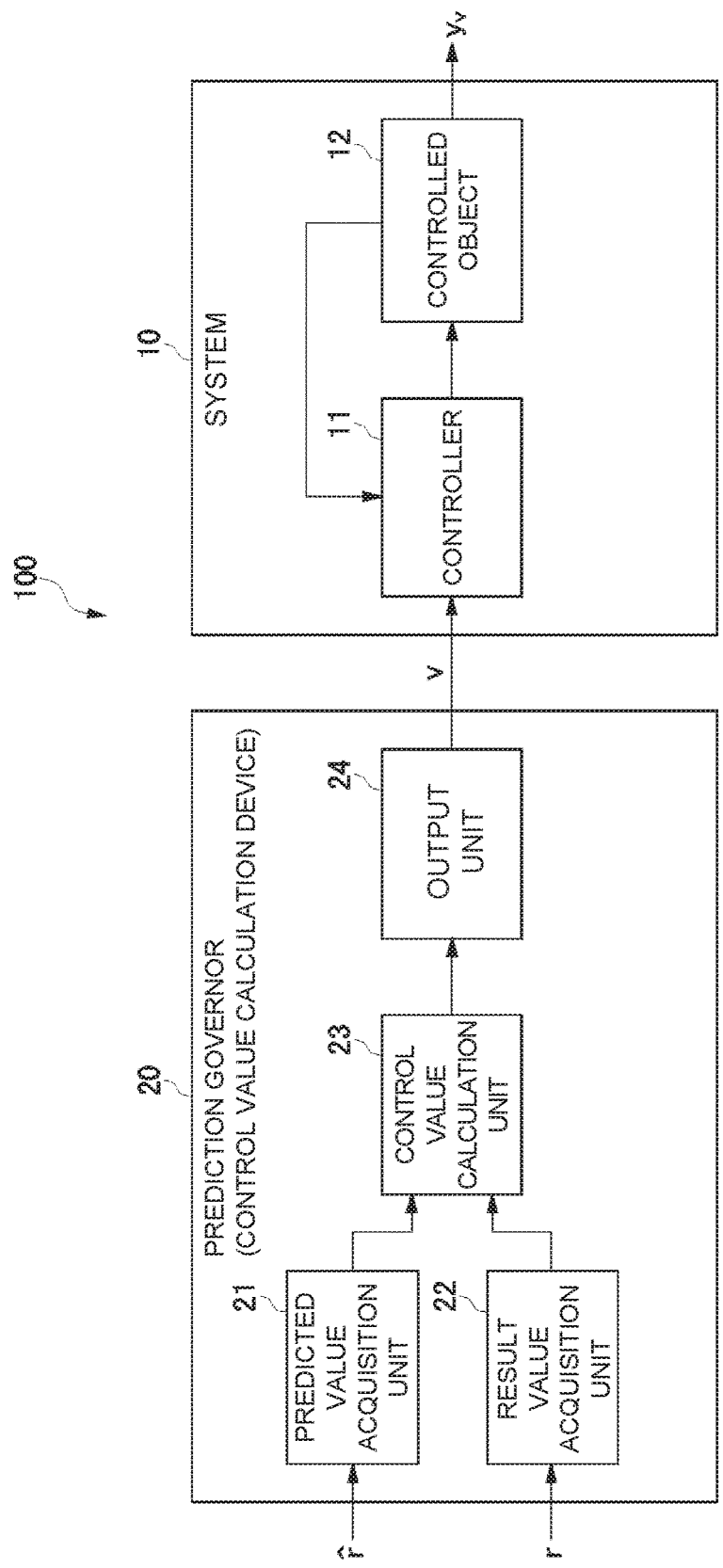
FIG. 1 is a block diagram illustrating a configuration of a control system including a predicted value shaping system according to an embodiment of the present invention.

FIG. 1 is a block diagram illustrating a configuration of a control system including the predicted value shaping system according to the embodiment of the present invention. A control system 100 is a feedforward control system including a prediction governor (predicted value shaping system) 20 and a system 10. The system 10 is a feedback control system including a controlled object 12 and a controller 11 that controls the controlled object 12. That is, in the control system 100, the prediction governor 20 is connected in series to the feedback control system 10, and a feedforward control system is configured as a whole. The controller 11 receives feedback of an output value of the controlled object 12, and performs feedback control for bringing the output of the controlled object 12 to a control value specified from the prediction governor 20 on the basis of the feedback. Specifically, the controller 11 outputs to the controlled object 12 a drive signal that is a control signal, in order to control the controlled object 12. The controlled object 12 drives in accordance with the drive signal received from the controller 11, and as a result, outputs a physical quantity depending on the drive signal.

In the present embodiment, a target value for controlling the controlled object 12 is unknown. An example of such a controlled object 12 is a power generator. Power output (generated) from the power generator has characteristics that it is difficult to save the power as electricity, and the power fails when supply is lower than demand. For this reason, power generation control is performed so that an amount of power securing a certain margin is generated according to an amount of power demand fluctuating from hour to hour. However, since energy is wasted when the margin is too large, balancing power generation control is desirably performed accurately estimating the amount of power demand. Accordingly, a technique of control value calculation according to the present embodiment is suitably applied to the power generation control.

The prediction governor 20 as the predicted value shaping system includes a predicted value acquisition unit 21, a result value acquisition unit 22, a control value calculation unit 23, and an output unit 24. As for the predicted value acquisition unit 21, the result value acquisition unit 22, the control value calculation unit 23, and the output unit 24 that are components of the prediction governor 20 as the predicted value shaping system, some or all of the components may be arranged to be distributed on a network, and some or all of the components may be included in the same device (predicted value shaping device).

The predicted value acquisition unit 21 acquires a predicted value $\hat{r}$ obtained by predicting the target value of the controlled object 12 with a predetermined prediction model. The result value acquisition unit 22 acquires a result value $r$ that is a previous target value of the controlled object 12. The control value calculation unit 23 calculates a control value $v$ for controlling the controlled object 12 by applying the result value $r$ and the predicted value $\hat{r}$ to a predetermined predicted value shaping algorithm to correct (shape) the predicted value $\hat{r}$. The output unit 24 outputs the control value $v$ calculated in the control value calculation unit 23 to the controller 11 of the system 10.

When the predicted value $\hat{r}$ is corrected with the result value $r$ by using the prediction governor 20, accuracy of prediction is improved, and the predicted value $\hat{r}$ which allows the output of the system 10 to approach an output of the system 10 of when the system 10 is controlled with the target value is obtained. However, a predicted value shaping algorithm in a prediction governor does not use information of the controlled object, and accordingly is not optimized for individual controlled objects. In other words, the predicted value shaping algorithm in the prediction governor is only a general-purpose one that can be applied with a certain degree of effect to any controlled object.

Therefore, the prediction governor 20 of the present embodiment corrects the predicted value by using a predicted value shaping algorithm obtained on the basis of a control model of feedback control in the system 10 (hereinafter, also referred to as a "control model of the controlled object 12"). Hereinafter, such a predicted value shaping algorithm will be specifically described.

1. Preparation of Symbols

Prior to describing the predicted value shaping algorithm, first, each symbol is defined as follows.

$$\mathbb{R}, \mathbb{R}_+, \mathbb{N} \qquad \text{[Expression 6]}$$

represent a set of real numbers, a set of positive real numbers, and a set of natural numbers, respectively.

Infinity norms of a vector x and a matrix M represented by $$x = [x_1 x_2 \ldots x_n]^T \in \mathbb{R}^n$$

$$M = \{M_{ij}\} \in \mathbb{R}^{n \times m} \qquad \text{[Expression 7]}$$

are respectively defined as $$\|x\|_\infty := \max_i |x_i|$$

$$\|M\|_\infty := \max_i \Sigma_{j=1}^m |M_{ij}| \qquad \text{[Expression 8]}$$

An infinity norm of a discrete-time signal e is $$\|e\|_\infty := \sup_{t \in \mathbb{N}} \|e(t)\|_\infty \qquad \text{[Expression 9]}$$

For a matrix M represented by $$M := \{M_{ij}\} \qquad \text{[Expression 10]}$$

an abs(M) is a matrix composed of absolute values of each element of the matrix M (abs(M)={M_{ij}}).

2. Problem Establishment

Figure 2:
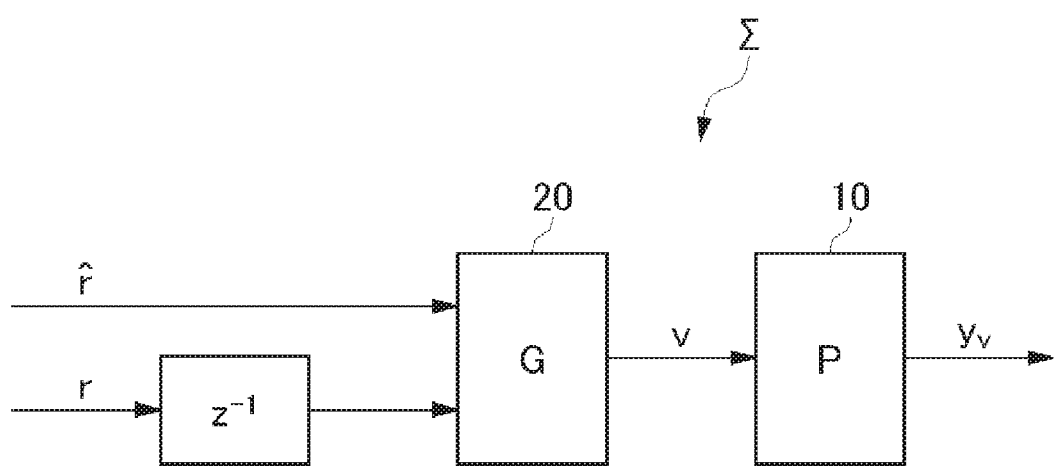
FIG. 2 is a block diagram illustrating a configuration of a feedforward control system according to the embodiment of the present invention.

FIG. 2 is a block diagram illustrating a configuration of a feedforward control system of the present embodiment. FIG. 2 illustrates a feedforward control system configured by a prediction governor 20 adopting a predicted value shaping algorithm G, and a system 10 performing feedback control with a control model P. Here, the control model P is a discrete-time linear model. In addition, "$z^{-1}$" represents operation of acquiring information before a certain time.

The control model P is represented by Equation (1) below.

[Expression 11]

$$P: \begin{cases} x_P(t+1) = A_P x_P(t) + B_P v(t) \\ y(t) = C_P x_P(t) \end{cases} \qquad (1)$$

Here, v(t) is a control value output by the prediction governor 20, and $y_v(t)$ is an output of the system 10. In addition, ($A_p$, $B_p$, $C_p$) are parameters of the control model P, and determined by using a conventional system identification method (for example, a least squares method) from input/output data.

In addition, $$t \in \{0\} \cup \mathbb{N} \qquad \text{[Expression 12]}$$

represents discrete time, $$x_p \in \mathbb{R}^n \qquad \text{[Expression 13]}$$

represents states, $$v \in \mathbb{R}^m \qquad \text{[Expression 14]}$$

represents inputs, $$y \in \mathbb{R}^l \qquad \text{[Expression 15]}$$

represents outputs, and $$A_p \in \mathbb{R}^{n \times n}, B_p \in \mathbb{R}^{n \times m}, C_p \in \mathbb{R}^{l \times n} \qquad \text{[Expression 16]}$$

represent constant matrices. The eigenvalue of $A_p$ exists within the unit circle on the complex plane (P is stable). In addition, an initial state is given by $$x_{p0} \in \mathbb{R}^n \qquad \text{[Expression 17]}$$

$$x_p(0) = x_{p0} \qquad \text{[Expression 18]}$$

The predicted value shaping algorithm G of the prediction governor 20 is represented by Equation (2) below.

[Expression 19]

$$G: \begin{cases} \xi(t+1) = \mathcal{A}\xi(t) + \mathcal{B}(\hat{r}(t-1) - r(t-1)) \\ v(t) = \mathcal{C}\xi(t) + \mathcal{D}(\hat{r}(t-1) - r(t-1)) + \hat{r}(t) \end{cases} \qquad (2)$$

Here, r(t−1) is a result value (a target value before a certain time), r̂(t−1) is a predicted value before a certain time obtained by a predetermined prediction model, and r̂(t) is a current predicted value. In addition, v(t) is a current control value (a value obtained by shaping the predicted value). In addition, (A, B, C, D) are design parameters of the predicted value shaping algorithm.

In addition, $$\xi \in \mathbb{R}^\mathcal{N} \qquad \text{[Expression 20]}$$

represents states of G ($\xi(0)=0$), $$\hat{r}, r \in \mathbb{R}^m \qquad \text{[Expression 21]}$$

represent inputs, $$v \in \mathbb{R}^m \qquad \text{[Expression 22]}$$

represents outputs, and $$\mathbb{R}^{\mathcal{N} \times \mathcal{N}} \in \mathcal{A}, \mathcal{B} \in \mathbb{R}^{\mathcal{N} \times m}, \mathcal{C} \in \mathbb{R}^{m \times \mathcal{N}}, \mathcal{D} \in \mathbb{R}^{m \times m} \qquad \text{[Expression 23]}$$

represent constant matrices.

The signal r is an actual target value. The current value r(t) cannot be acquired, but the result value r(t−1) can be acquired. The signal r̂ is a predicted value, so that both the current value r̂(t) and the previous value r̂(t−1) can be used. For the r and r̂, a next assumption (A1) is provided.

$$(A1) \|r - \hat{r}\|_\infty \leq \Delta \qquad \text{[Expression 24]}$$

The assumption (A1) means that a prediction error is $$\Delta \in \mathbb{R}_+ \qquad \text{[Expression 25]}$$

or less, that is, the predicted value r̂ is obtained with an accuracy of Δ or less by using some estimation method.

Figure 3:
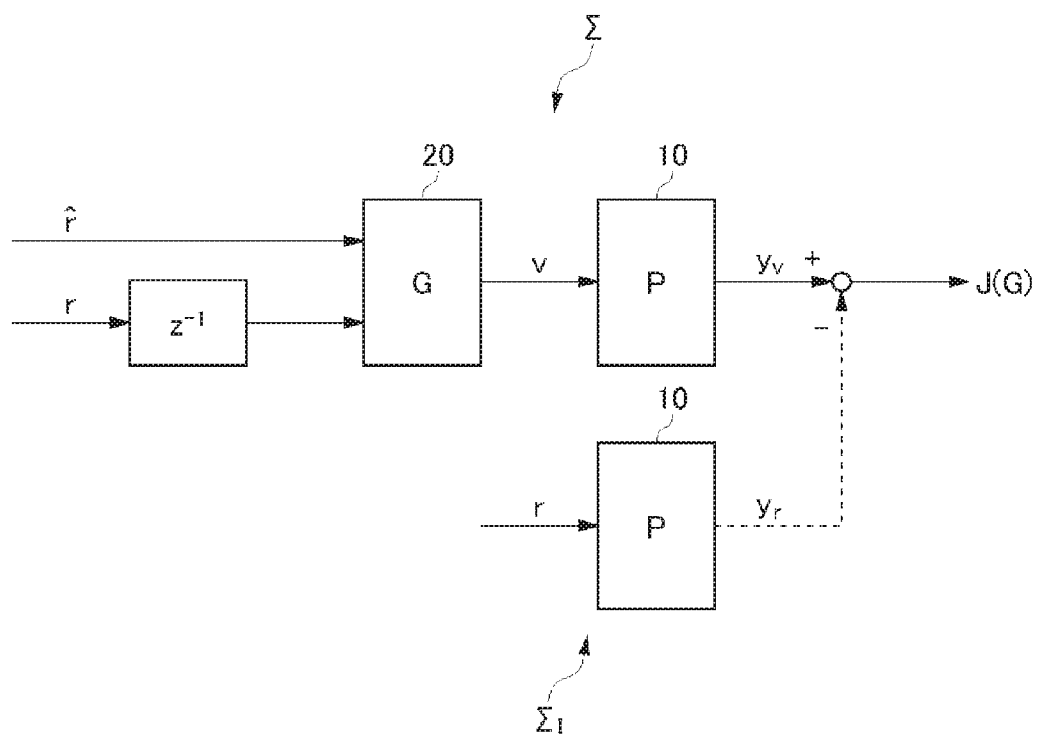
FIG. 3 is a block diagram for describing an evaluation function according to the embodiment of the present invention.
Figure 4:
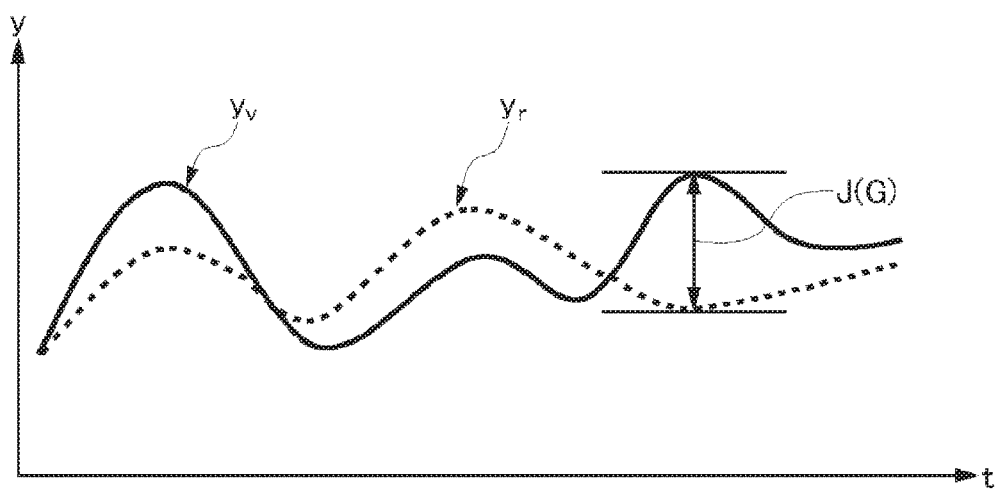
FIG. 4 is a graph for describing the evaluation function according to the embodiment of the present invention.

Here, in order to obtain a predicted value shaping algorithm in which the control value calculation unit 23 calculates the control value v which allows the output of the system 10 to approach an output of the system 10 of when the system 10 is controlled with the target value, an evaluation function J(G) illustrated in FIG. 3, FIG. 4, and Equation (3) is considered. FIG. 3 is a block diagram for describing the evaluation function J(G), and FIG. 4 is a graph for describing the evaluation function J(G). The evaluation function J(G) is an evaluation function of when the control model of the controlled object 12

$$P(x_{p0} \in \mathbb{R}^n) \qquad \text{[Expression 26]}$$

is arbitrarily given in the feedforward control system Σ, and is given by the equation below.

$$J(G) := \sup_{\hat{r} \in \ell_\infty^m} \|y_v - y_r\|_\infty \quad \text{[Expression 27]}$$

Here, $y_v$ is an output of the system 10 of when the system is controlled with the control value v calculated in the prediction governor 20 of the present embodiment, and $y_r$ is an output of the system 10 of when the system is controlled with the target value r.

As illustrated in FIG. 3, FIG. 4, and Equation (3), the evaluation function J(G) represents the maximum difference between the output $y_v$ of the feedforward control system Σ of the present embodiment and the output $y_r$ of an ideal feedforward control system $Σ_I$ of when the target value r can be used, that is, the maximum output difference of when the worst predicted value is given. In other words, the evaluation function J(G) is a worst case evaluation index. Accordingly, the predicted value shaping algorithm G for minimizing the evaluation function J(G) is an optimal predicted value shaping algorithm. In the following, optimal design will be described of the prediction governor for obtaining the predicted value shaping algorithm G for minimizing the evaluation function J(G).

3. Optimal Design of Prediction Governor

3-1. Performance Analysis

Before a solution is given of the predicted value shaping algorithm G of the prediction governor 20 for reducing the value of the evaluation function J(G), performance of a given predicted value shaping algorithm G is analyzed. Then, on the basis of the result, the optimal predicted value shaping algorithm G is given.

First, Equation (1) and Equation (2) are combined, and $$\begin{bmatrix} x_P(t+1) \\ \xi(t+1) \end{bmatrix} = \begin{bmatrix} A_P & 0 \\ 0 & \mathcal{A} \end{bmatrix} \begin{bmatrix} x_P(t) \\ \xi(t) \end{bmatrix} + \begin{bmatrix} 0 \\ \mathcal{B} \end{bmatrix}(\hat{r}(t-1) + r(t-1)) + \begin{bmatrix} B_P \\ 0 \end{bmatrix} v(t)$$

$$= \begin{bmatrix} A_P & B_P\mathcal{C} \\ 0 & \mathcal{A} \end{bmatrix} \begin{bmatrix} x_P(t) \\ \xi(t) \end{bmatrix} + \begin{bmatrix} B_P\mathcal{D} \\ \mathcal{B} \end{bmatrix}(\hat{r}(t-1) - r(t-1)) + \begin{bmatrix} B_P \\ 0 \end{bmatrix}\hat{r}(t) \quad \text{[Expression 28]}$$

is obtained. Accordingly, when it is defined that $$x := [x_P^T \xi^T]^T \quad \text{(The initial value } x_0 := [x_{P0}^T 0]^T) \quad \text{[Expression 29]}$$

the feedforward control system can be expressed as follows.

$$\Sigma : \begin{cases} x(t+1) = \begin{bmatrix} A_P & B_P\mathcal{C} \\ 0 & \mathcal{A} \end{bmatrix} x(t) + \\ \begin{bmatrix} B_P\mathcal{D} \\ \mathcal{B} \end{bmatrix}(\hat{r}(t-1) - r(t-1)) + \begin{bmatrix} B_P \\ 0 \end{bmatrix}\hat{r}(t) \\ y_v(t) = [C_P \; 0]x(t) \end{cases} \quad \text{[Expression 30]}$$

Next, the difference between the output $y_v$ of Σ and the output $y_r$ of $Σ_I$ at time $$T \in \mathbb{N} \quad \text{[Expression 31]}$$

is represented by $$y_v(T) - y_r(T) = [C_P \; 0] \begin{bmatrix} A_P & B_P\mathcal{C} \\ 0 & \mathcal{A} \end{bmatrix}^T x_0 + \quad \text{[Expression 32]}$$

$$\sum_{t=0}^{T-1} [C_P \; 0] \begin{bmatrix} A_P & B_P\mathcal{C} \\ 0 & \mathcal{A} \end{bmatrix}^{T-1-t}$$

$$\begin{bmatrix} B_P\mathcal{D} \\ \mathcal{B} \end{bmatrix}(\hat{r}(t-1) - r(t-1)) +$$

$$\sum_{t=0}^{T-1} [C_P \; 0] \begin{bmatrix} A_P & B_P\mathcal{C} \\ 0 & \mathcal{A} \end{bmatrix}^{T-1-t}$$

$$\begin{bmatrix} B_P \\ 0 \end{bmatrix}\hat{r}(t) - C_P A_P^T x_{P0} -$$

$$\sum_{t=0}^{T-1} C_P A_P^{T-1-t} B_P r(t)$$

$$= \sum_{t=0}^{T-1} [C_P \; 0] \begin{bmatrix} A_P & B_P\mathcal{C} \\ 0 & \mathcal{A} \end{bmatrix}^{T-1-t}$$

$$\begin{bmatrix} B_P\mathcal{D} \\ \mathcal{B} \end{bmatrix}(\hat{r}(t-1) - r(t-1)) +$$

$$\sum_{t=0}^{T-1} [C_P \; 0] \begin{bmatrix} A_P & B_P\mathcal{C} \\ 0 & \mathcal{A} \end{bmatrix}^{T-1-t}$$

$$\begin{bmatrix} B_P \\ 0 \end{bmatrix}(\hat{r}(t) - r(t))$$

Here, it is defined that $$w(t) := \hat{r}(t) - r(t) \quad \text{[Expression 33]}$$

From the assumption (A1), $$\|w(t)\|_\infty \quad \text{[Expression 34]}$$

is obtained. At this time, when it is noted that w(t)=0 (t≤0), $$y_v(T) - y_r(T) = \sum_{t=0}^{T-1} [C_P \; 0] \begin{bmatrix} A_P & B_P\mathcal{C} \\ 0 & \mathcal{A} \end{bmatrix}^{T-1-t} \quad \text{[Expression 35]}$$

$$\begin{bmatrix} B_P\mathcal{D} \\ \mathcal{B} \end{bmatrix}\omega(t-1) +$$

$$\sum_{t=0}^{T-1} [C_P \; 0] \begin{bmatrix} A_P & B_P\mathcal{C} \\ 0 & \mathcal{A} \end{bmatrix}^{T-1-t}$$

$$\begin{bmatrix} B_P \\ 0 \end{bmatrix}\omega(t)$$

$$= C_P B_P \omega(T-1) + \sum_{t=0}^{T-2} [C_P \; 0]$$

$$\begin{bmatrix} A_P & B_P\mathcal{C} \\ 0 & \mathcal{A} \end{bmatrix}^{T-2-t} \left(\begin{bmatrix} B_P\mathcal{D} \\ \mathcal{B} \end{bmatrix} + \begin{bmatrix} A_P & B_P\mathcal{C} \\ 0 & \mathcal{A} \end{bmatrix} \begin{bmatrix} B_P \\ 0 \end{bmatrix}\right)\omega(t)$$

$$= C_P B_P \omega(T-1) +$$

$$\sum_{t=0}^{T-2} [C_P \; 0] \begin{bmatrix} A_P & B_P\mathcal{C} \\ 0 & \mathcal{A} \end{bmatrix}^{T-2-t}$$

$$\begin{bmatrix} B_P\mathcal{D} + A_P B_P \\ \mathcal{B} \end{bmatrix}\omega(t)$$

is obtained. Thus, from $$\|w(t)\|_\infty \leq \Delta \quad \text{[Expression 36]}$$

the following expression is obtained.

$$J(G) \leq \|\text{abs}(C_P B_P) + \sum_{t=0}^{\infty} \text{abs} \quad \text{[Expression 37]}$$

$$\left([C_P \ 0]\begin{bmatrix} A_P & B_P \mathcal{C} \\ 0 & \mathcal{A} \end{bmatrix}^t \begin{bmatrix} B_P \mathcal{D} + A_P B_P \\ \mathcal{B} \end{bmatrix}\right)\Big\|_\infty \Delta$$

Further, since the predicted value r^ exists at which the equal sign of the above expression holds,

[Expression 38]

$$J(G) = \|\text{abs}(C_P B_P) + \sum_{t=0}^{\infty} \text{abs} \quad (3)$$

$$\left([C_P \ 0]\begin{bmatrix} A_P & B_P \mathcal{C} \\ 0 & \mathcal{A} \end{bmatrix}^t \begin{bmatrix} B_P \mathcal{D} + A_P B_P \\ \mathcal{B} \end{bmatrix}\right)\Big\|_\infty \Delta$$

is obtained.

From Equation (3), it is possible to estimate in advance the degree of the influence on the output of the system 10 by the prediction error A. Further, the value of the first term of Equation (3) is determined by only the parameters of P, and the value of the second term is determined by the parameters of the control model P and the predicted value shaping algorithm G. Accordingly, since all terms are non-negative values, when the predicted value shaping algorithm G is determined so that the value of the second term is reduced as small as possible, the predicted value shaping algorithm G can be obtained for reducing the value of the evaluation function J(G).

3-2. Optimal Prediction Governor

The predicted value shaping algorithm can be obtained for bringing the second term of Equation (3) to zero. Actually, the optimal predicted value shaping algorithm G is represented by $$G^*: \begin{cases} \xi(t+1) = \mathcal{A}^* \xi(t) + \mathcal{B}^* (\hat{r}(t-1) - r(t-1)) \\ v(t) = \mathcal{C}^* \xi(t) + \mathcal{D}^* (\hat{r}(t-1) - r(t-1)) + \hat{r}(t) \end{cases} \quad \text{[Expression 39]}$$

$$\mathcal{A}^* = A_P - B_P(C_P B_P)^{-1} C_P A_P$$

$$\mathcal{B}^* = -B_P(C_P B_P)^{-1} C_P A_P B_P + A_P B_P$$

$$\mathcal{C}^* = -(C_P B_P)^{-1} C_P A_P$$

$$\mathcal{D}^* = -(C_P B_P)^{-1} C_P A_P B_P$$

and the value of the evaluation function is obtained by $$J(G^*) = \|\text{abs}(C_P B_P)\|_\infty \Delta \quad \text{[Expression 40]}$$

Equation (4) represents the performance limit of G.

In this way, a predicted value shaping algorithm G* of the prediction governor 20 of the present embodiment is characterized by the parameters of the control model P of the system 10. That is, the predicted value shaping algorithm G* is a custom made type predicted value shaping algorithm determined for the control model P. Thus, it is possible to accurately estimate the influence on the output of the system 10 represented by the control model P given by the prediction error r^(t−1)−r (t−1) having previously occurred, and to perform correction so as to reduce the influence as small as possible.

In addition, from Equation (4), it can be seen that when the prediction error A is reduced, the value of J(G*) is reduced, that is, the output error is reduced. Further, J(G*) is smaller as $$\|C_P B_p\| \quad \text{[Expression 41]}$$

of the control model P is smaller. As described above, since the control model P is a discrete-time system, $$\|C_P B_p\| \quad \text{[Expression 42]}$$

is reduced as the sampling period of when a continuous-time system $P_c$ is discretized is shorter. From this, it can be seen that performance of the prediction governor 20 is improved as the sampling period is shorter.

4. Numerical Example

Next, a numerical example of the feedforward control system (minimum phase system) controlled with the control model P below is shown.

$$P: \begin{cases} x_P(t+1) = \begin{bmatrix} 0.9 & 0.05 \\ 0 & 0.99 \end{bmatrix} x_P(t) + \begin{bmatrix} 0.003 \\ 0.099 \end{bmatrix} v(t) \\ y(t) = [1 \ 0] x_P(t) \end{cases} \quad \text{[Expression 43]}$$

Here, the initial value is $$x_{P0} := [0.5 \ 0]^T \quad \text{[Expression 44]}$$

Figure 5:
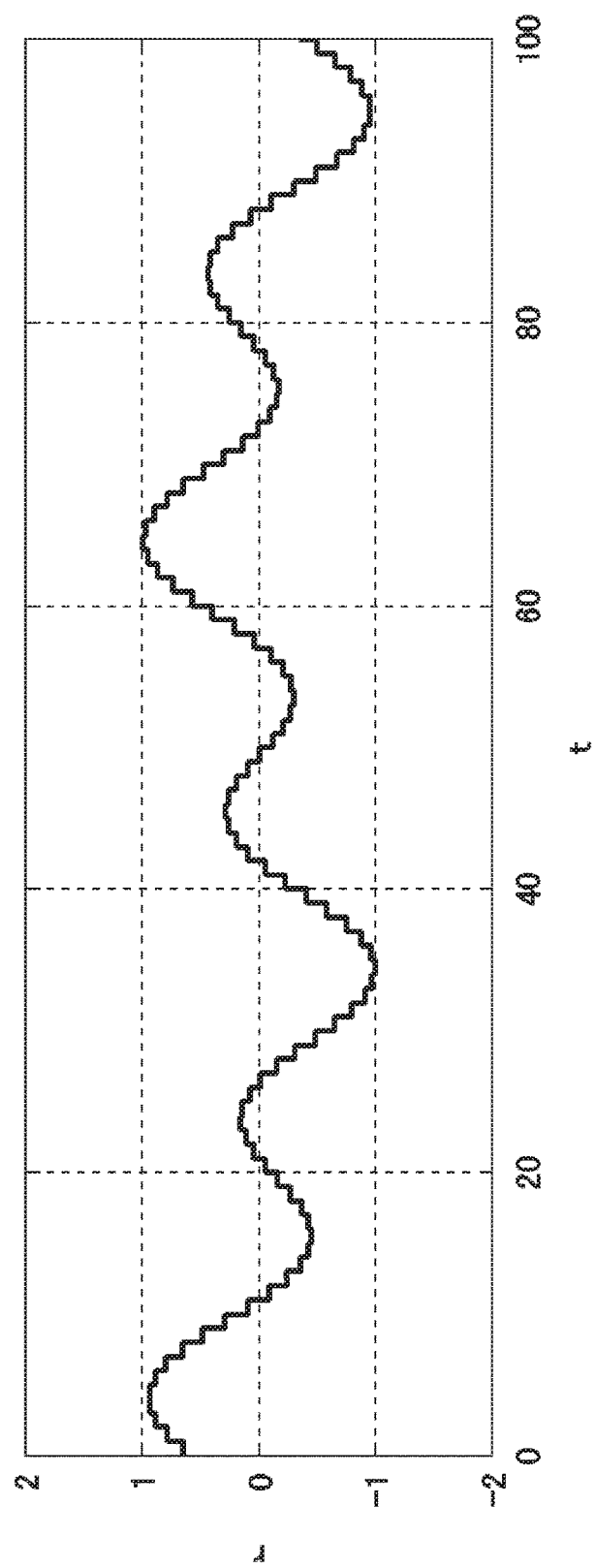
FIG. 5 is a graph illustrating a target value in a numerical example of the embodiment of the present invention.
Figure 6:
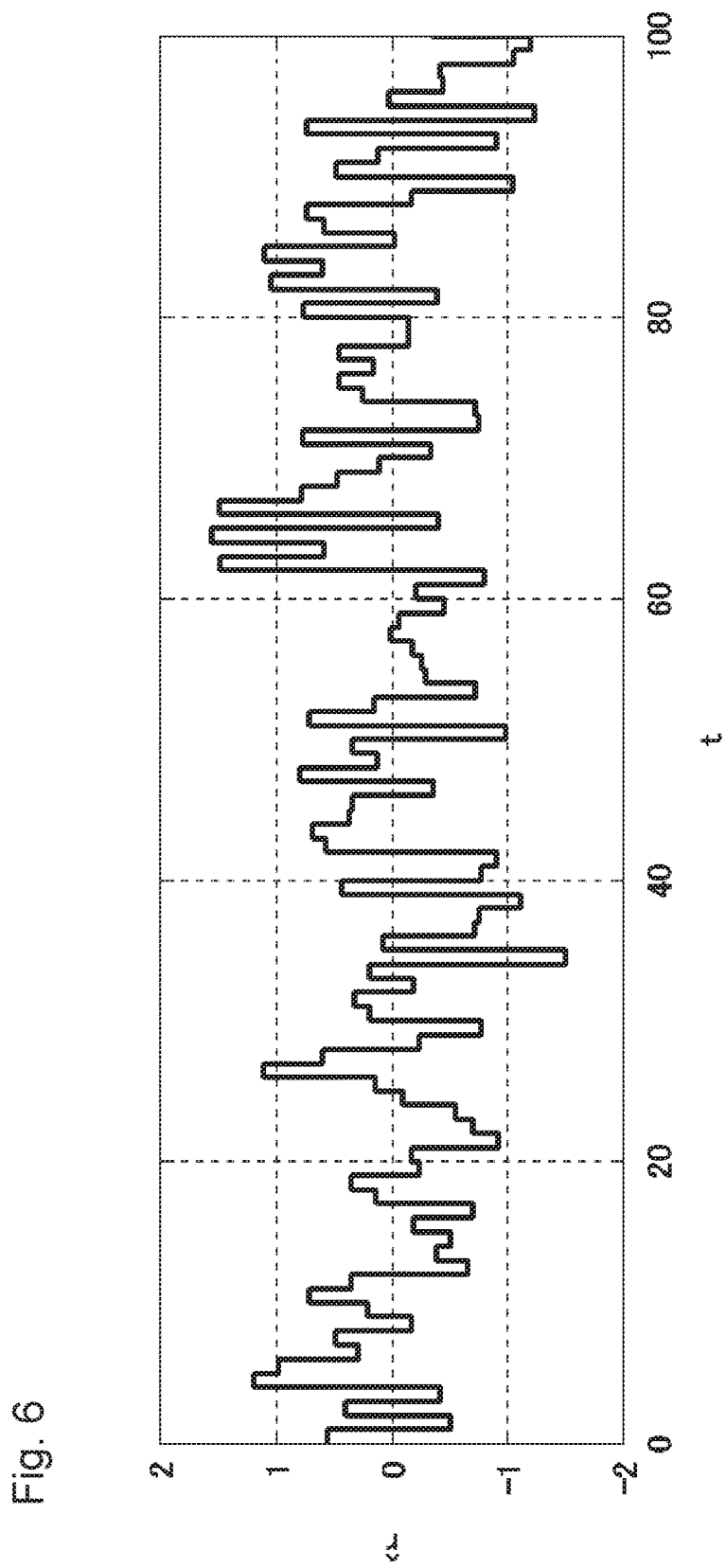
FIG. 6 is a graph illustrating a predicted value in the numerical example of the embodiment of the present invention.

FIG. 5 is a graph illustrating the target value, and FIG. 6 is a graph illustrating the predicted value for the target value in FIG. 5. As the target value, r(t)=0.5 sin(0.1πt)+0.5 cos (0.03πt) is used. The prediction error of the predicted value illustrated in FIG. 6 is Δ=1.6429.

Figure 7:
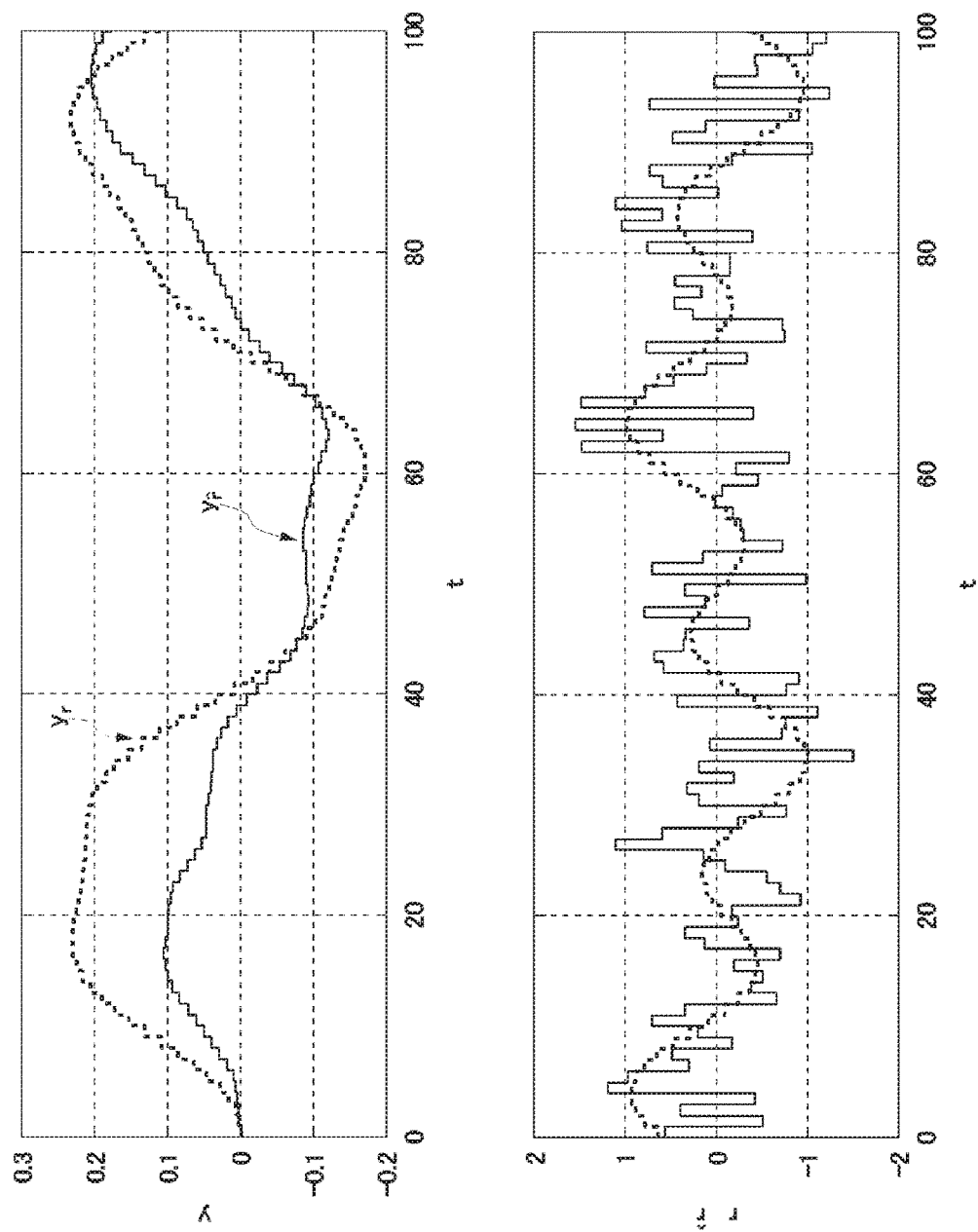
FIG. 7 is a graph illustrating a comparative example of when the predicted value is used and a prediction governor is not used.
Figure 8:
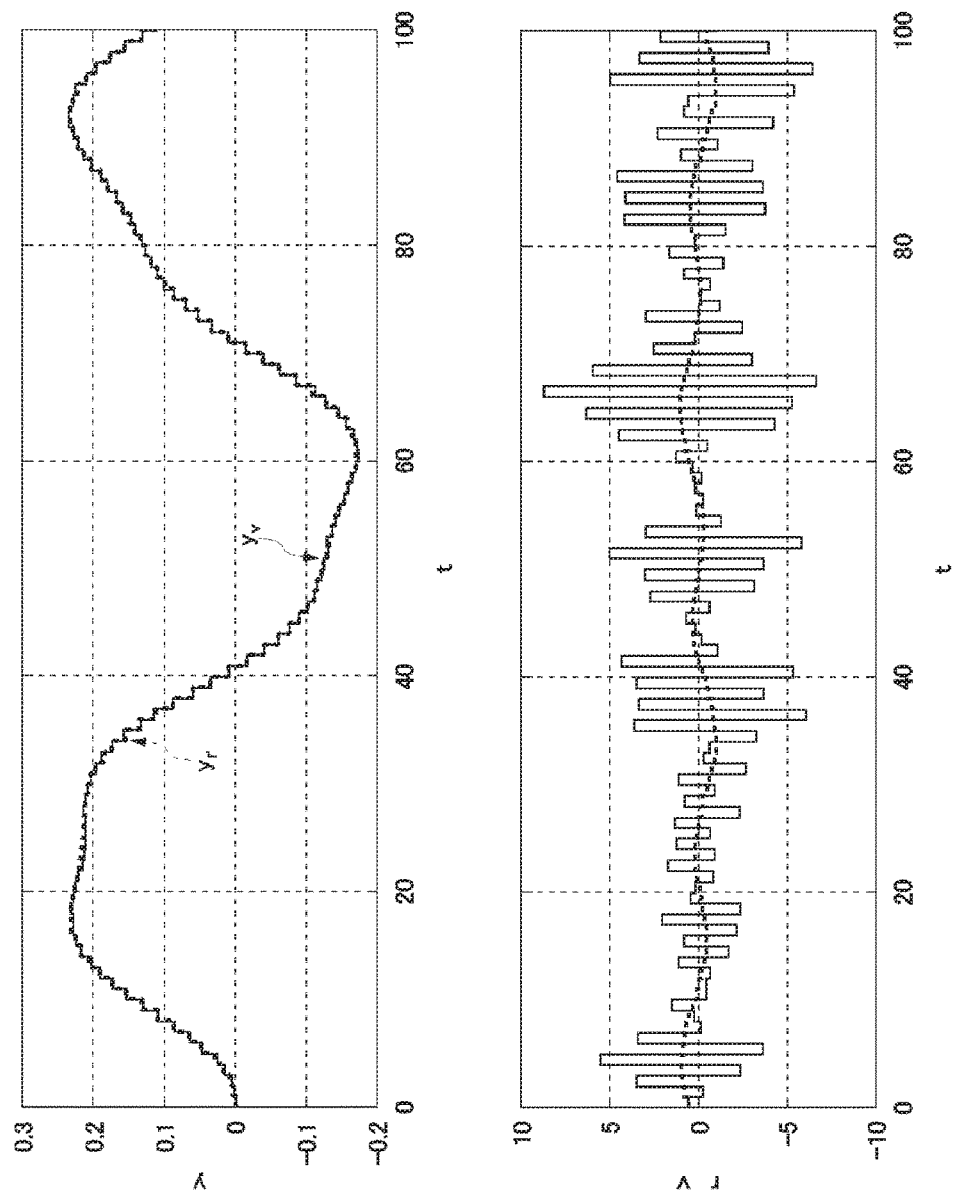
FIG. 8 is a graph illustrating a numerical example of when the predicted value is corrected by using the prediction governor according to the embodiment of the present invention.

FIG. 7 is a graph illustrating a result (output of the controlled object 12) $y_{\hat{r}}$ of when the predicted value r^ is used but the prediction governor 20 is not used, and FIG. 8 is a graph illustrating a result (output of the controlled object 12) $y_v$ obtained by correcting the predicted value r^ by using the prediction governor 20 adopting the optimized predicted value shaping algorithm G* to calculate the control value v, and controlling the controlled object 12 with the control value v. In FIG. 7 and FIG. 8, the dashed line $y_r$ is the ideal output of when the target value r is used. Incidentally, J(G*)=0.0049, and $$\|y_v - y_r\| = 0.0049 \quad \text{[Expression 45]}$$

Referring to FIG. 8, when the predicted value r^ is corrected with the optimized predicted value shaping algorithm G*, the output $y_v$ of the system 10 substantially coincides with the output $y_r$ of system 10 of when the system is controlled with the target value r.

As described above, in the feedforward control system 100 of the present embodiment, the predicted value shaping algorithm G* adopted in the control value calculation unit 23 of the prediction governor 20 uses the parameters of the control model P of the controlled object 12, so that the predicted value can be corrected depending on the controlled object 12.

Figure 9:
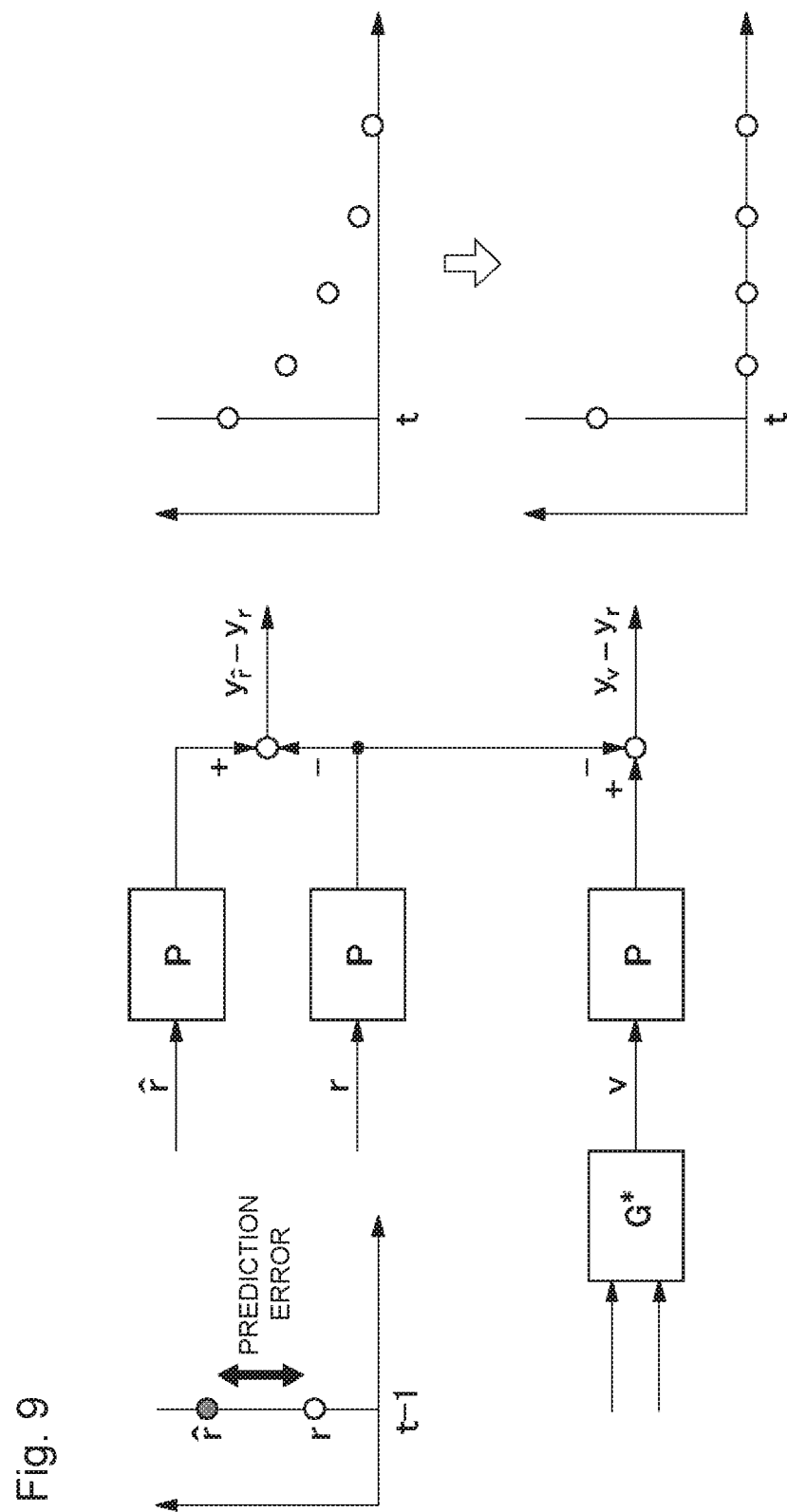
FIG. 9 is a diagram for describing an effect of the feedforward control system according to the embodiment of the present invention.

FIG. 9 is a diagram for describing an effect of the feedforward control system 100 of the present embodiment. The predicted value shaping algorithm G* adopted in the control value calculation unit 23 of the prediction governor 20 of the present embodiment is capable of accurately estimating the influence on the output of the controlled object 12 given by the prediction error having previously occurred (that is, the difference r^(t−1)−r(t−1) between the previous predicted value r^(t−1) and the result value r(t−1)), and correcting the current predicted value r^(t) so as to reduce the influence.

The prediction governor 20 corrects the predicted value r^(t) to calculate the control value v (t), by filtering the prediction error r^(t−1)−r(t−1) having previously occurred with the predicted value shaping algorithm G*, by using the predicted value r^(t), the previous predicted value r^(t−1), and the result value (previous target value) r(t−1), and the control value v(t) of a value which allows the output of the system 10 to approach an output of the system 10 of when the system 10 is controlled with the target value r(t) can be obtained as the control value v(t), and the output error of the system 10

$$\|y_v - y_r\|$$ [Expression 46]

can be reduced. Incidentally, as illustrated in FIG. 9, the influence of one step ahead cannot be improved even when the prediction governor 20 is used, but the influence after that can be reduced.

Figure 10:
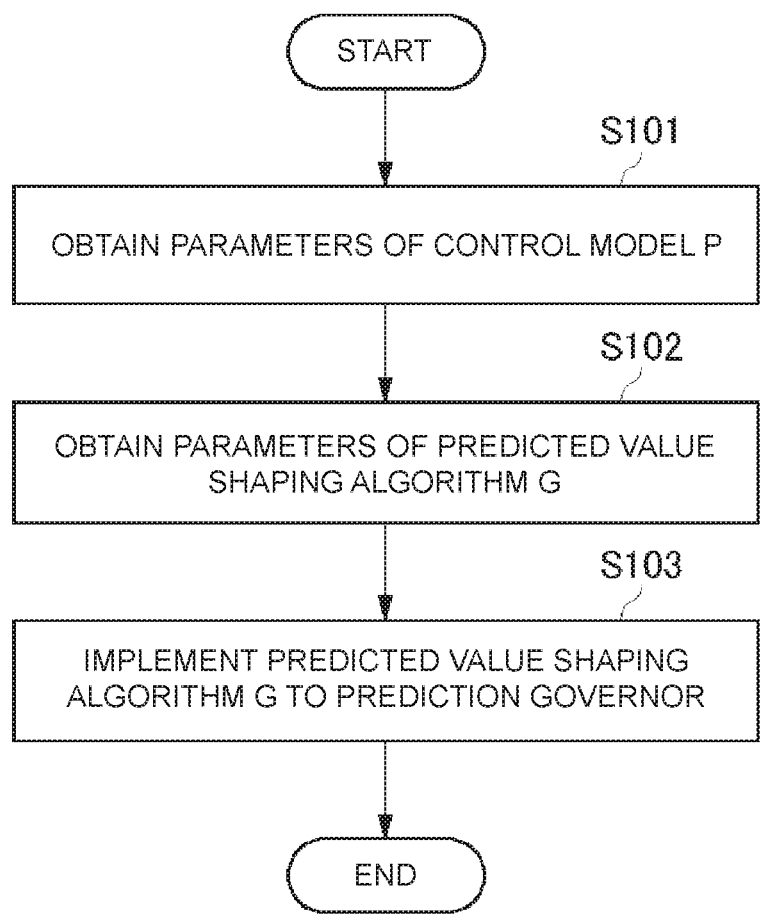
FIG. 10 is a flowchart illustrating a procedure for achieving the feedforward control system according to the embodiment of the present invention.

Next, a procedure will be described for achieving the feedforward control system 100 of the present embodiment. FIG. 10 is a flowchart illustrating a procedure for achieving the feedforward control system 100 of the present embodiment. First, the parameters ($A_p$, $B_p$, $C_p$) of the control model P of the system 10 are obtained by system identification (step S101).

Next, the parameters (A*, B*, C*, D*) of the predicted value shaping algorithm G* are obtained by using the parameters ($A_p$, $B_p$, $C_p$) of the control model P (step S102). Then, the prediction governor 20 adopting the predicted value shaping algorithm G* is implemented as a program to a calculator by using the parameters (A*, B*, C*, D*) of the predicted value shaping algorithm G* (step S103).

In the above embodiment, optimal design of the prediction governor is performed, and the predicted value shaping algorithm G for minimizing the evaluation function J(G) is obtained; however, as the predicted value shaping algorithm G, it is not always necessary to adopt the one for minimizing the evaluation function J(G). For example, in a case in which the evaluation function J(G) for minimizing the predicted value shaping algorithm G is obtained by an analytic method by modification of mathematical expressions, general optimization methods (such as a gradient method, and a Newton method), or a heuristic method referred to as a heuristic, the predicted value shaping algorithm G of when the evaluation function J(G) is less than a predetermined threshold value may be adopted. Alternatively, in a case in which the predicted value shaping algorithm G is obtained by the optimization method such as the above gradient method or Newton method, the predicted value shaping algorithm G of when it is determined that the evaluation function J(G) has converged may be adopted. That is, when the candidate of the predicted value shaping algorithm G is updated to $G_1$, $G_2$, . . . , the value of the evaluation function J(G) is also changed to $J(G_1)$, $J(G_2)$, . . . , and it is regarded that the evaluation function J(G) has converged when the absolute value of the amount of change of the value of J(G) at this time ($|J(G_i)−J(G_{(i+1)})|$) is ε or less (ε is a small positive value determined in advance), and the predicted value shaping algorithm G at that time may be adopted.

In addition, the above embodiment uses as the evaluation function J(G) the maximum difference between the output $y_v$ of the actual feedforward control system Σ and the output $y_r$ of the ideal feedforward control system $Σ_I$ of when the target value r can be used, that is, the maximum output difference of when the worst predicted value is given; however, the output difference that is the evaluation function J(G) may be any function quantifying the proximity of the line $y_v − y_r$ of the graph to zero, and, for example, may be the Euclidean norm of the difference between the output $y_v$ and the output $y_r$.

In the above embodiment, it has been described that the predicted value shaping algorithm is obtained and the prediction governor 20 adopting the algorithm is used; however, a configuration may be added for the predicted value shaping system to dynamically determine the predicted value shaping algorithm. That is, the predicted value shaping system may include an evaluation unit and an algorithm determination unit, in addition to the configuration of the above prediction governor 20.

Figure 11:
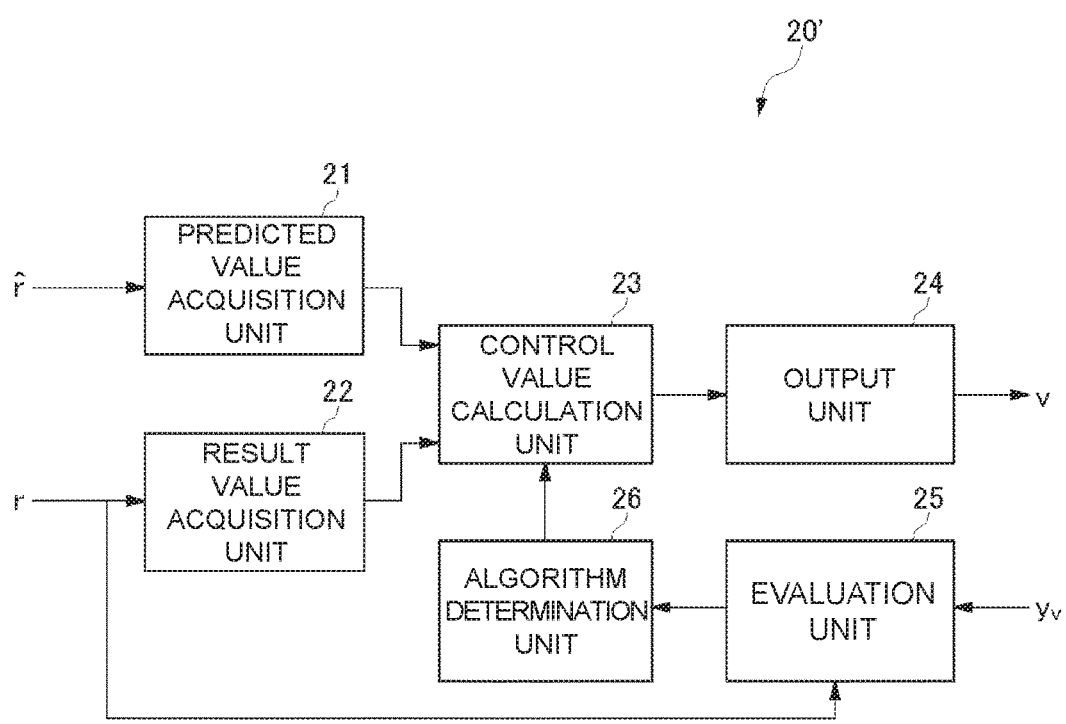
FIG. 11 is a block diagram illustrating a configuration of a predicted value shaping system for dynamically determining a predicted value shaping algorithm according to the embodiment of the present invention.
Figure 12:
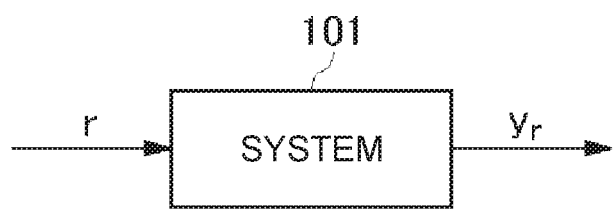
FIG. 12 is a block diagram illustrating a configuration of a conventional ideal feedforward control system.
Figure 13:
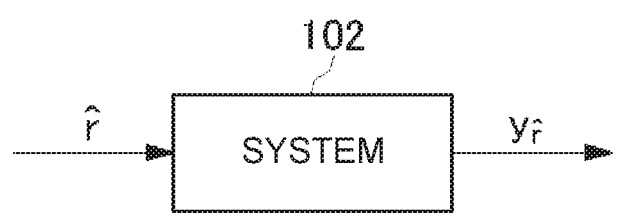
FIG. 13 is a block diagram illustrating a configuration of a control system controlled with a conventional predicted value.
Figure 14:
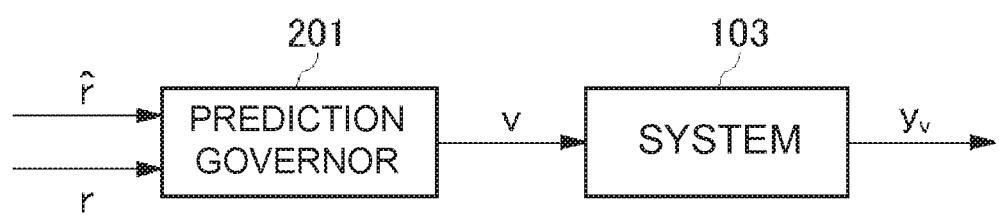
FIG. 14 is a block diagram illustrating a configuration of a control system provided with a prediction governor.

FIG. 11 is a block diagram illustrating a configuration of a predicted value shaping system for dynamically determining the predicted value shaping algorithm. A predicted value shaping system 20' includes an evaluation unit 25 and an algorithm determination unit 26, in addition to the configuration of the above prediction governor 20. Also in the predicted value shaping system 20', some or all configurations may be arranged to be distributed on the network, and some or all configurations may be included in the same device (predicted value shaping device).

The evaluation unit 25 inputs the output $y_v$ of the actual feedforward control system Σ, and evaluates magnitude of the evaluation function J(G) expressing the output difference from the output $y_r$ of the ideal feedforward control system $Σ_I$ using the target value r, thereby evaluating magnitude of influence on the output of the controlled object 12 given by the previous prediction error. When the evaluation function J(G) is greater than the predetermined threshold value, the evaluation unit 25 determines that it is necessary to redetermine the predicted value shaping algorithm, and causes the algorithm determination unit 26 to redetermine the predicted value shaping algorithm.

When the instruction of redetermining the predicted value shaping algorithm is received from the evaluation unit 25, the algorithm determination unit 26 obtains the predicted value shaping algorithm G for minimizing the evaluation function J(G), as described above. Incidentally, also in this case, it is not always necessary to minimize the evaluation function J(G), and the algorithm G for reducing the evaluation function J(G) below the predetermined threshold value may be used as the predicted value shaping algorithm, and the algorithm G of when it is determined that the evaluation function J(G) has converged may be used as the predicted value shaping algorithm.

Application Example

In the above, it has been described that the feedforward control system 100 of the present embodiment can be applied to the power generation system that predicts the amount of power demand; however, the control system of the present invention can be applied to not only the power generation system, but also another system. When the target value of the system is unknown, the present invention can be effectively applied.

Besides the power generation system described above, the system in which the target value is unknown includes a system for predicting the amount of solar radiation in a solar power generation system, a system using a sensor with poor response (for example, a system for controlling an engine), a system in which sensor information is transmitted via network communication, and a system that processes and uses sensor information (for example, a system in which it takes time to process an image acquired, such as robot control or automatic driving control of an automobile), for example, and the present invention can be applied to these systems.

In addition, the present invention can also be applied to an artificial pancreatic system. In the artificial pancreatic system, continuous glucose monitoring (CGM) is performed with a sensor attached to subcutaneous tissue. The CGM measures a sugar concentration in interstitial fluid, and it has been found that there is a certain correlation between the sugar concentration and the blood glucose level, but the sugar concentration is delayed for 10 to 15 minutes from the blood glucose level in fact.

In addition, for example, the present invention can also be applied to a field of logistics when the controlled object is a supply chain, and the control target is warehouse inventory management. In this case, the satisfaction level can be used as the target value or the predicted value, and the satisfaction level based on a customer survey can be used as the result information (previous value).

In addition, for example, the present invention can also be applied to a field of medical treatment when the controlled object is an insulin injection, and the control target is control of the blood glucose level. In this case, the blood glucose level can be used as the target value or the predicted value, and the blood glucose level ten minutes ago based on body fluid measurement can be used as the result information (previous value).

In addition, for example, the present invention can also be applied to a field of ITS when the controlled object is driving assistance or automatic driving of the automobile, and the control target is track following control. In this case, the environment information (information of an obstacle, a signal, and the like) can be used as the target value or the predicted value, and the detailed information obtained over time can be used as the result information (previous value).

In addition, for example, the present invention can also be applied to a field of agriculture when the controlled object is planned production of plants, and the control target is control of the growing environment. In this case, the growing condition of the plants can be used as the target value or the predicted value, and the information of the actual growing condition can be used as the result information (previous value).

In addition, for example, the present invention can also be applied to a field of architecture when the controlled object is air conditioning control, and the control target is determination of operation time and the number of units to be operated. In this case, the environment information (information of temperature, weather, and the like) can be used as the target value or the predicted value, and the actual environment information can be used as the result information (previous value).

Preferred embodiments of the present invention currently considered has been described above; however, the embodiments can be variously modified, and the appended claims are intended to include all the modifications within the true spirit and scope of the present invention.

Industrial Applicability

The present invention has the effect that the predicted value is corrected (shaped) with the algorithm using the parameters of the control model of the controlled object, so that correction suitable for the controlled object can be performed, and the output closer to the ideal output can be obtained, and is useful as the predicted value shaping system for calculating the control value for controlling the controlled object, and the like.

REFERENCE SIGNS LIST

100 Feedforward control system (control system)
10 System
11 Controller
12 Controlled object
20 Prediction governor (predicted value shaping system)
21 Predicted value acquisition unit
22 Result value acquisition unit
23 Control value calculation unit
24 Output unit
25 Evaluation unit
26 Algorithm determination unit

What is claimed is:

1. A power generation predicted value shaping system for correcting a predicted amount of required power of a target power demand obtained by predicting the target power demand for controlling an amount of power generation of a controlled power generator by feedforward control, the power generation predicted value shaping system comprising:

a predicted value acquisition unit that acquires the predicted amount of required power of the target power demand;

a result value acquisition unit that acquires a result value of the target power demand that is a previous target power demand of the controlled power generator; and a control value calculation unit that calculates a control value for controlling the controlled power generator by applying the result value of the target power demand and the predicted amount of required power of the target power demand to an algorithm to correct the predicted amount of required power of the target power demand, wherein the algorithm uses parameters of a control model of the controlled power generator, wherein the parameters of the control model are Ap, Bp, and Cp which are obtained by system identification, the control model is represented by Equation (1), $$\begin{cases} x_P(t+1) = A_P x_P(t) + B_P v(t) \\ y(t) = C_P x_P(t) \end{cases} \quad (1)$$

where v(t) is the control value at time t, and y(t) is an output of the controlled power generator at the time t, and the algorithm is represented by Equation (2), $$\begin{cases} \xi(t+1) = \mathcal{A}^*\xi(t) + \mathcal{B}^*(\hat{r}(t-1) - r(t-1)) \\ v(t) = C^*\xi(t) + \mathcal{D}^*(\hat{r}(t-1) - r(t-1)) + \hat{r}(t) \end{cases} \quad (2)$$

where $\hat{r}(t)$ is the predicted amount of required power at the time t, $\hat{r}(t-1)$ is the previous predicted amount of required power before the time t, r(t-1) is the result value, and $\mathcal{A}^* = A_P - B_P(C_P B_P)^{-1} C_P A_P$ $\mathcal{B}^* = -B_P(C_P B_P)^{-1} C_P A_P B_P + A_P B_P$ $$\mathcal{C}^* = -(C_P B_P)^{-1} C_P A_P$$

$$\mathcal{D}^* = -(C_P B_P)^{-1} C_P A_P B_P.$$

2. The predicted power generation value shaping system according to claim 1, wherein the algorithm is an algorithm for correcting the predicted amount of required power of the target power demand so as to reduce influence on an output of the controlled power generator given by a previous prediction error that is a difference between the previous predicted amount of required power of the target power demand and the result value of the target power demand.

3. A power generation predicted value shaping system for correcting a predicted amount of required power of a target power demand obtained by predicting the target power demand for controlling an amount of power generation of a controlled power generator by feedforward control, the power generation predicted value shaping system comprising:
- a predicted value acquisition unit that acquires the predicted amount of required power of the target power demand;
- a result value acquisition unit that acquires a result value of the target power demand that is a previous target power demand of the controlled object;
- and a control value calculation unit that calculates a control value for controlling the controlled power generator by applying the result value of the target value and the predicted value of the target power demand to an algorithm to correct the predicted value of the target power demand, wherein the algorithm is an algorithm for correcting the predicted value of the target power demand so as to reduce influence on an output of the controlled power generator given by a previous prediction error that is a difference between the previous predicted value of the target power demand and the result value of the target power demand, wherein
the parameters of the control model are AP, BP, and Cp are obtained by system identification,
the control model is represented by Equation (1), $$\begin{cases} x_P(t+1) = A_P x_P(t) + B_P v(t) \\ y(t) = C_P x_P(t) \end{cases} \quad (1)$$

where v(t) is the control value at time t, and y(t) is an output of the controlled power generator at the time t, and the algorithm is represented by Equation (2), $$\begin{cases} \xi(t+1) = \mathcal{A}^* \xi(t) + \mathcal{B}^* (\hat{r}(t-1) - r(t-1)) \\ v(t) = C^* \xi(t) + \mathcal{D}^* (\hat{r}(t-1) - r(t-1)) + \hat{r}(t) \end{cases} \quad (2)$$

where r̂(t) is the predicted amount of required power at the time t, r̂(t−1) is the previous predicted amount of required power before the time t, r(t−1) is the result value, and $$\mathcal{A}^* = A_P - B_P (C_P B_P)^{-1} C_P A_P$$

$$\mathcal{B}^* = -B_P (C_P B_P)^{-1} C_P A_P B_P + A_P B_P$$

$$\mathcal{C}^* = -(C_P B_P)^{-1} C_P A_P$$

$$\mathcal{D}^* = -(C_P B_P)^{-1} C_P A_P B_P.$$

4. The power generation predicted value shaping system according to claim 3, wherein the influence is an output difference between an actual output and an output of when a target power demand of when there is not the prediction error is applied.

5. The power generation predicted value shaping system according to claim 4, further comprising an evaluation unit that evaluates magnitude of the influence by using an evaluation function expressing the output difference.

6. The power generation predicted value shaping system according to claim 3, further comprising an algorithm determination unit that determines the algorithm.

7. The power generation predicted value shaping system according to claim 6, further comprising an evaluation unit that evaluates magnitude of the influence, wherein the algorithm determination unit determines the algorithm when the magnitude of the influence evaluated by the evaluation unit is greater than a predetermined magnitude.

8. The power generation predicted value shaping system according to claim 4, wherein the algorithm is an algorithm for minimizing the influence.

9. The power generation predicted value shaping system according to claim 4, wherein the algorithm is an algorithm for reducing the influence below a predetermined value.

10. The power generation predicted value shaping system according to claim 4, wherein the algorithm is an algorithm of when it is determined that the influence has converged.

11. A power generation control system comprising: the power generation predicted value shaping system according to claim 1; the controlled power generator; and a controller that controls the power generator in accordance with the control value calculated by the power generation predicted value shaping system.

12. A power generation predicted value shaping method for correcting a predicted amount of required power of a target power demand obtained by predicting the target power demand for controlling a controlled power generator by feedforward control, the power generation predicted value shaping method comprising:
- a predicted value acquisition step of acquiring the predicted amount of required power of the target power demand;
- a result value acquisition step of acquiring a result value of the target power demand that is a previous target value of the controlled power generator;
- and a control value calculation step of calculating a control value for controlling the controlled power generator by applying the result value of the target power demand and the predicted amount of required power of the target power demand to an algorithm to correct the predicted amount of required power of the target power demand, wherein the algorithm uses parameters of a control model of the controlled power generator, wherein
the parameters of the control model are Ap, Bp, and Cp which are obtained by system identification,
the control model is represented by Equation (1), $$\begin{cases} x_P(t+1) = A_P x_P(t) + B_P v(t) \\ y(t) = C_P x_P(t) \end{cases} \quad (1)$$

where v(t) is the control value at time t, and y(t) is an output of the controlled power generator at the time t, and the algorithm is represented by Equation (2), $$\begin{cases} \xi(t+1) = \mathcal{A}^*\xi(t) + \mathcal{B}^*(\hat{r}(t-1) - r(t-1)) \\ v(t) = C^*\xi(t) + \mathcal{D}^*(\hat{r}(t-1) - r(t-1)) + \hat{r}(t) \end{cases} \quad (2)$$

where r^(t) is the predicted amount of required power at the time t, r^(t−1) is the previous predicted amount of required power before the time t, r(t−1) is the result value,
and $\mathcal{A}^* = A_P - B_P(C_P B_P)^{-1} C_P A_P$ $\mathcal{B}^* = -B_P(C_P B_P)^{-1} C_P A_P B_P + A_P B_P$ $\mathcal{C}^* = -(C_P B_P)^{-1} C_P A_P$ $\mathcal{D}^* = -(C_P B_P)^{-1} C_P A_P B_P.$ 13. A power generation predicted value shaping method for correcting a predicted amount of required power of a target power demand obtained by predicting the target power demand for controlling a controlled power generator by feedforward control, the power generation predicted value shaping method comprising:
  a predicted value acquisition step of acquiring the predicted amount of required power of the target power demand;
  a result value acquisition step of acquiring a result value of the target power demand that is a previous target power demand of the controlled power generator;
  and a control value calculation step of calculating a control value for controlling the controlled power generator by applying the result value of the target power demand and the predicted amount of required power of the target power demand to an algorithm to correct the predicted amount of required power of the target power demand, wherein the algorithm is an algorithm for correcting the predicted amount of required power of the target power demand so as to reduce influence on an output of the controlled power generator given by a previous prediction error that is a difference between the previous predicted value of the target power demand and the result value of the target power demand, wherein
the parameters of the control model are Ap, Bp, and Cp which are obtained by system identification,
the control model is represented by Equation (1), $$\begin{cases} x_P(t+1) = A_P x_P(t) + B_P v(t) \\ y(t) = C_P x_P(t) \end{cases} \quad (1)$$

where v(t) is the control value at time t, and y(t) is an output of the controlled power generator at the time t, and the algorithm is represented by Equation (2), $$\begin{cases} \xi(t+1) = \mathcal{A}^*\xi(t) + \mathcal{B}^*(\hat{r}(t-1) - r(t-1)) \\ v(t) = C^*\xi(t) + \mathcal{D}^*(\hat{r}(t-1) - r(t-1)) + \hat{r}(t) \end{cases} \quad (2)$$

where r^(t) is the predicted amount of required power at the time t, r^(t−1) is the previous predicted amount of required power before the time t, r(t−1) is the result value,
and $\mathcal{A}^* = A_P - B_P(C_P B_P)^{-1} C_P A_P$ $\mathcal{B}^* = -B_P(C_P B_P)^{-1} C_P A_P B_P + A_P B_P$ $\mathcal{C}^* = -(C_P B_P)^{-1} C_P A_P$ $\mathcal{D}^* = -(C_P B_P)^{-1} C_P A_P B_P.$ 14. A power generation control method comprising: a control value calculation step of calculating a control value with a predicted value shaping method according to claim 12; and a control step of controlling the controlled power generator with the control value calculated in the control value calculation step.

\* \* \* \* \*